United States Patent
Zhang et al.

(10) Patent No.: US 12,348,461 B2
(45) Date of Patent: Jul. 1, 2025

(54) ANTENNA PANEL PAIR REPORTING AND CONFIGURATION FOR FULL-DUPLEX COMMUNICATION

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Tao Luo, San Diego, CA (US); Junyi Li, Fairless Hills, PA (US)

( * ) Notice: Subject to any disclaimer, the term of this patent is extended or adjusted under 35 U.S.C. 154(b) by 516 days.

(21) Appl. No.: 17/371,418

(22) Filed: Jul. 9, 2021

(65) Prior Publication Data

US 2023/0017004 A1    Jan. 19, 2023

(51) Int. Cl.
| | |
|---|---|
| *H04L 5/14* | (2006.01) |
| *H04B 7/06* | (2006.01) |
| *H04L 5/00* | (2006.01) |
| *H04W 24/10* | (2009.01) |

(52) U.S. Cl.
CPC .............. *H04L 5/14* (2013.01); *H04B 7/0617* (2013.01); *H04L 5/0048* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 11,140,695 B1* | 10/2021 | Eyuboglu | ............ | H04W 72/535 |
| 11,206,549 B1* | 12/2021 | Eyuboglu | ............ | H04J 11/0079 |
| 11,271,699 B1* | 3/2022 | Eyuboglu | ............ | H04B 7/0691 |
| 11,375,527 B1* | 6/2022 | Eyuboglu | .......... | H04B 7/15528 |
| 2011/0243040 A1* | 10/2011 | Khan | .................... | H01Q 21/061 |
| | | | | 370/280 |
| 2016/0277212 A1* | 9/2016 | Forbes | .................. | H04L 27/063 |
| 2017/0257146 A1* | 9/2017 | Szeto | ...................... | H04W 4/80 |
| 2019/0081767 A1* | 3/2019 | Luo | ........................ | H04L 5/1461 |
| 2019/0335443 A1* | 10/2019 | Liu | ...................... | H04B 7/0695 |
| 2020/0052753 A1* | 2/2020 | Raghavan | ............ | H04B 7/0695 |
| 2020/0343944 A1* | 10/2020 | Kim | ...................... | H04B 7/0691 |
| 2021/0127351 A1* | 4/2021 | Stojanovski | .......... | H04W 48/16 |
| 2021/0167821 A1* | 6/2021 | Chen | .................... | H04B 7/0617 |
| 2021/0344375 A1* | 11/2021 | Turkowski | ................ | H04L 5/14 |
| 2022/0022065 A1* | 1/2022 | Wang | .................... | H04W 24/08 |
| 2022/0200665 A1* | 6/2022 | Rom | .................... | H04B 7/0617 |
| 2022/0286170 A1* | 9/2022 | Flordelis | ................ | H04W 8/24 |
| 2022/0295322 A1* | 9/2022 | Haghighat | ............ | H04W 24/10 |
| 2022/0338045 A1* | 10/2022 | Nielsen | ............... | H04W 56/001 |
| 2023/0299835 A1* | 9/2023 | Svendsen | ............. | H04B 7/0617 |
| | | | | 375/267 |
| 2023/0344504 A1* | 10/2023 | Cha | ......................... | H04B 7/06 |

* cited by examiner

*Primary Examiner* — Saumit Shah

(57) ABSTRACT

Certain aspects of the present disclosure provide techniques for reporting and configuring antenna panel pairs for full-duplex communication. A method performed by a user equipment includes transmitting, to a base station (BS), antenna panel information indicating one or more pairs of antenna panels that are capable of full duplex communication with the BS, receiving, from the BS, configuration information indicating at least one pair of antenna panels, from the indicated one or more pairs of antenna panels, for the full duplex communication, and using the at least one pair of antenna panels for the full duplex communication with the BS.

25 Claims, 10 Drawing Sheets

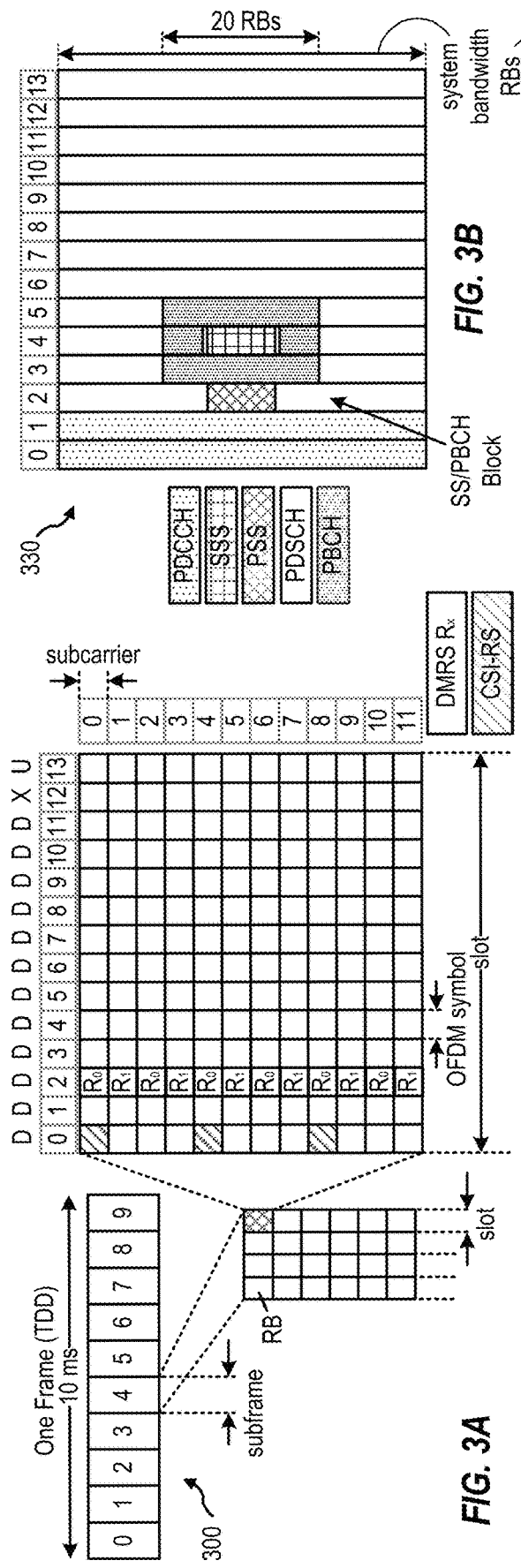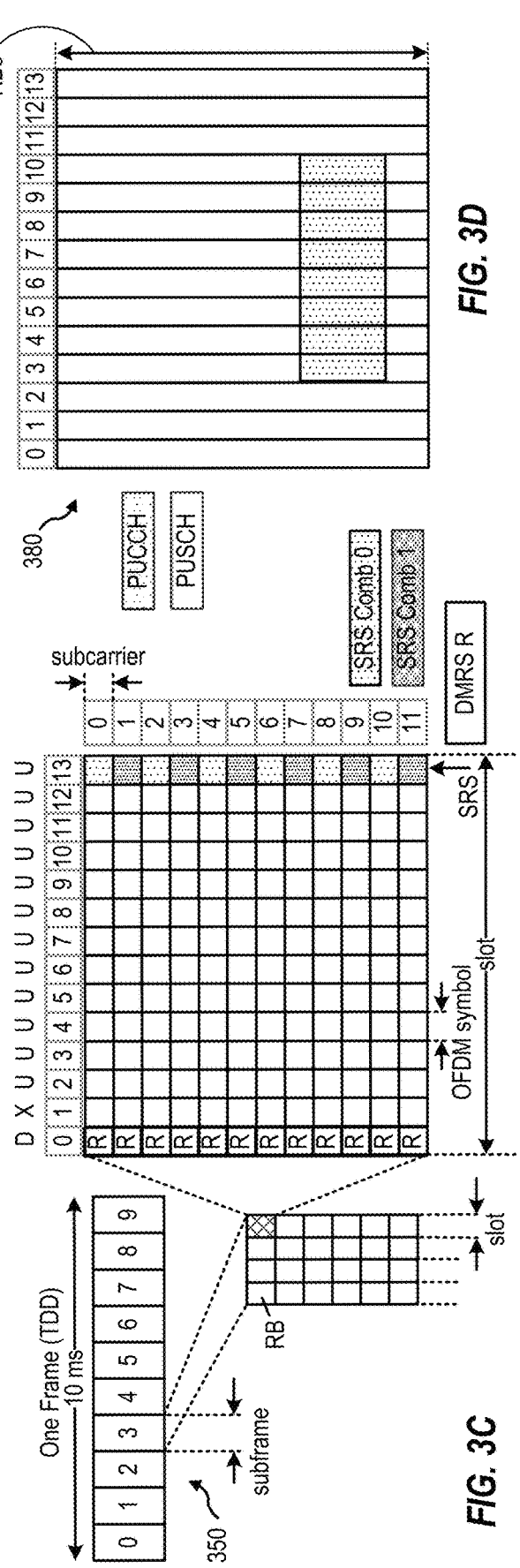
FIG. 3A  FIG. 3B  FIG. 3C  FIG. 3D

ANTENNA PANEL PAIR REPORTING AND CONFIGURATION FOR FULL-DUPLEX COMMUNICATION

INTRODUCTION

Aspects of the present disclosure relate to wireless communications, and more particularly, to techniques for reporting and configuring antenna panel pairs for full-duplex communication.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method for wireless communication performed by a user equipment (UE). The method generally includes transmitting, to a base station (BS), antenna panel information indicating one or more pairs of antenna panels that are capable of full duplex communication with the BS, receiving, from the BS, configuration information indicating at least one pair of antenna panels, from the indicated one or more pairs of antenna panels, for the full duplex communication, and using the at least one pair of antenna panels for the full duplex communication with the BS.

Certain aspects can be implemented in an apparatus for wireless communication. The apparatus includes a memory and at least one processor coupled with the memory. The memory and at least one processor may be configured to: transmit, to a base station (BS), antenna panel information indicating one or more pairs of antenna panels that are capable of full duplex communication with the BS, receive, from the BS, configuration information indicating at least one pair of antenna panels, from the indicated one or more pairs of antenna panels, for the full duplex communication, and use the at least one pair of antenna panels for the full duplex communication with the BS.

Certain aspects can be implemented in an apparatus for wireless communication. The apparatus includes means for transmitting, to a base station (BS), antenna panel information indicating one or more pairs of antenna panels that are capable of full duplex communication with the BS, means for receiving, from the BS, configuration information indicating at least one pair of antenna panels, from the indicated one or more pairs of antenna panels, for the full duplex communication, and means for using the at least one pair of antenna panels for the full duplex communication with the BS.

Certain aspects can be implemented in a non-transitory computer-readable medium for wireless communication. The non-transitory computer-readable medium comprises executable instructions that, when executed by one or more processors of an apparatus, cause the apparatus to: transmit, to a base station (BS), antenna panel information indicating one or more pairs of antenna panels that are capable of full duplex communication with the BS, receive, from the BS, configuration information indicating at least one pair of antenna panels, from the indicated one or more pairs of antenna panels, for the full duplex communication, and use the at least one pair of antenna panels for the full duplex communication with the BS.

Certain aspects can be implemented in a computer program product for wireless communication. The computer program product may be embodied on a computer-readable storage medium and may comprise code for: transmitting, to a base station (BS), antenna panel information indicating one or more pairs of antenna panels that are capable of full duplex communication with the BS, receiving, from the BS, configuration information indicating at least one pair of antenna panels, from the indicated one or more pairs of antenna panels, for the full duplex communication, and using the at least one pair of antenna panels for the full duplex communication with the BS.

Certain aspects can be implemented in a method for wireless communication performed by a base station (BS). The method generally includes transmitting, to a user equipment (UE), configuration information indicating at least one pair of antenna panels of the UE to use full duplex communication and communicating with the UE based on the configuration information.

Certain aspects can be implemented in an apparatus for wireless communication. The apparatus includes a memory and at least one processor coupled with the memory. The memory and at least one processor may be configured to: transmit, to a user equipment (UE), configuration information indicating at least one pair of antenna panels of the UE to use full duplex communication and communicate with the UE based on the configuration information.

Certain aspects can be implemented in an apparatus for wireless communication. The apparatus includes means for transmitting, to a user equipment (UE), configuration information indicating at least one pair of antenna panels of the UE to use full duplex communication and means for communicating with the UE based on the configuration information.

Certain aspects can be implemented in a non-transitory computer-readable medium for wireless communication. The non-transitory computer-readable medium comprises executable instructions that, when executed by one or more processors of an apparatus, cause the apparatus to: transmit, to a user equipment (UE), configuration information indicating at least one pair of antenna panels of the UE to use full duplex communication and communicate with the UE based on the configuration information.

Certain aspects can be implemented in a computer program product for wireless communication. The computer program product may be embodied on a computer-readable storage medium and may comprise code for: transmitting, to a user equipment (UE), configuration information indicating at least one pair of antenna panels of the UE to use full duplex communication and communicating with the UE based on the configuration information.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for reporting and configuring antenna panel pairs for full-duplex (FD) communication.

In some cases, certain wireless communications devices, such as a user equipment (UE), may be capable of FD communication with a base station (BS) using different antenna panels. For example, in some cases, the UE may use a first antenna panel to receive downlink transmissions from the BS while simultaneously using a second antenna panel to transmit uplink transmissions to the BS or another BS. In some cases, however, the downlink transmissions on the first panel and the uplink transmission the second antenna panel may interfere with each other. This type of interference experienced at the UE is known as self-interference. This self-interference can lead to negative effects, such as transmissions that cannot be properly received or decoded. These improperly received/decoded transmissions may lead to wasted time and frequency resources within a wireless communications network, as well as wasted power resources at a transmitting device and a receiving device, associated with having to retransmit/re-receive the transmissions that were not previously properly received/decoded due to the self-interference between the antenna panels.

Accordingly, aspects of the present disclosure provide techniques to help reduce self-interference experienced by wireless communications devices that are capable of FD communication. For example, in some cases, such techniques may include a UE reporting, to a BS, antenna panel information indicating one or more pairs of antenna panels that are capable of FD communication. In some cases, the one or more pairs of antenna panels that are capable of the FD communication may include pairs of antenna panels that do not (or minimally) interfere with each other. The UE may then be configured with at least one of these pairs of antenna panels, thereby reducing self-interference when performing the FD communication and helping to alleviate the negative effects described above.

Introduction to Wireless Communication Networks

Figure 1:
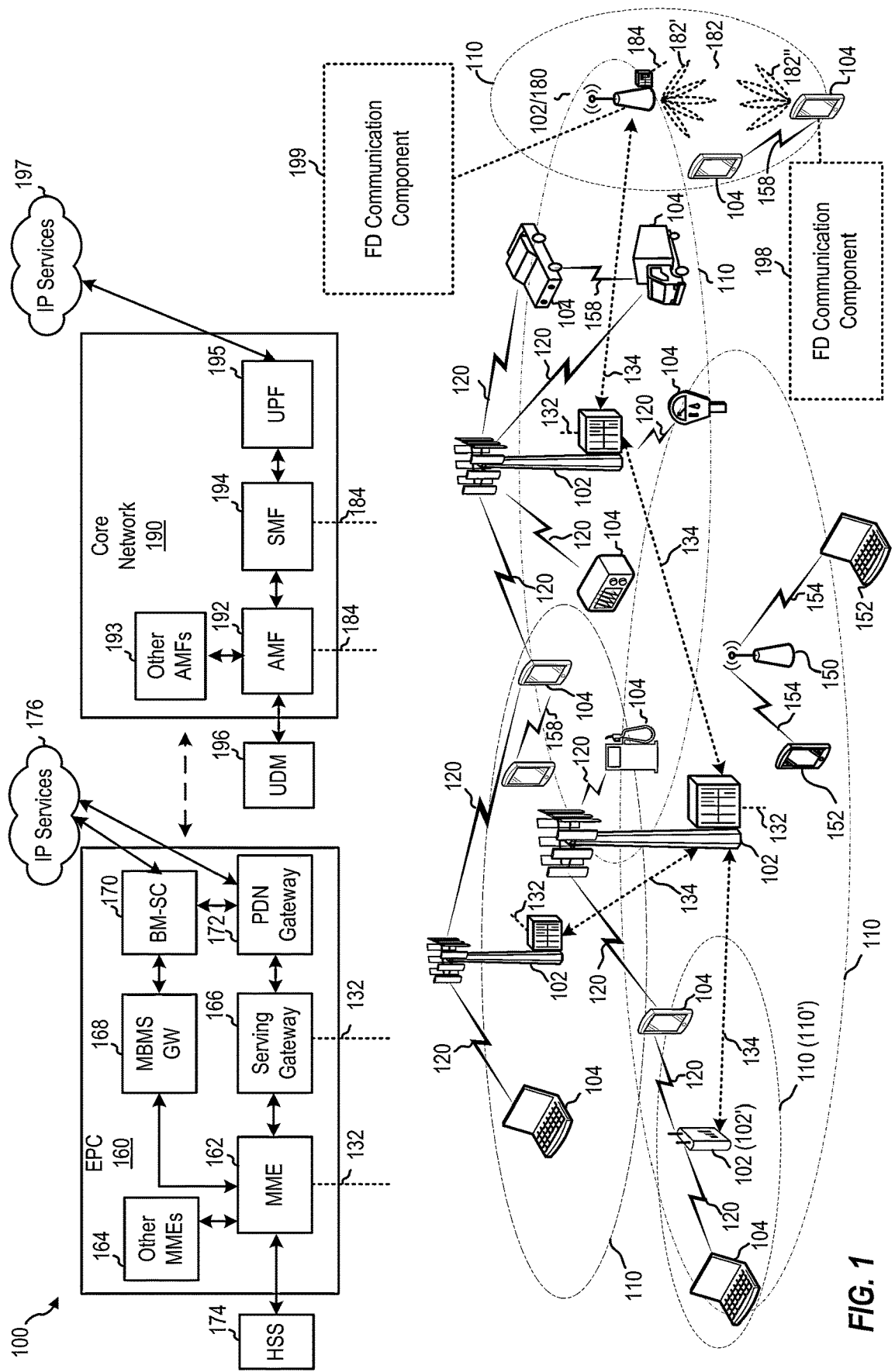
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Figure 6:
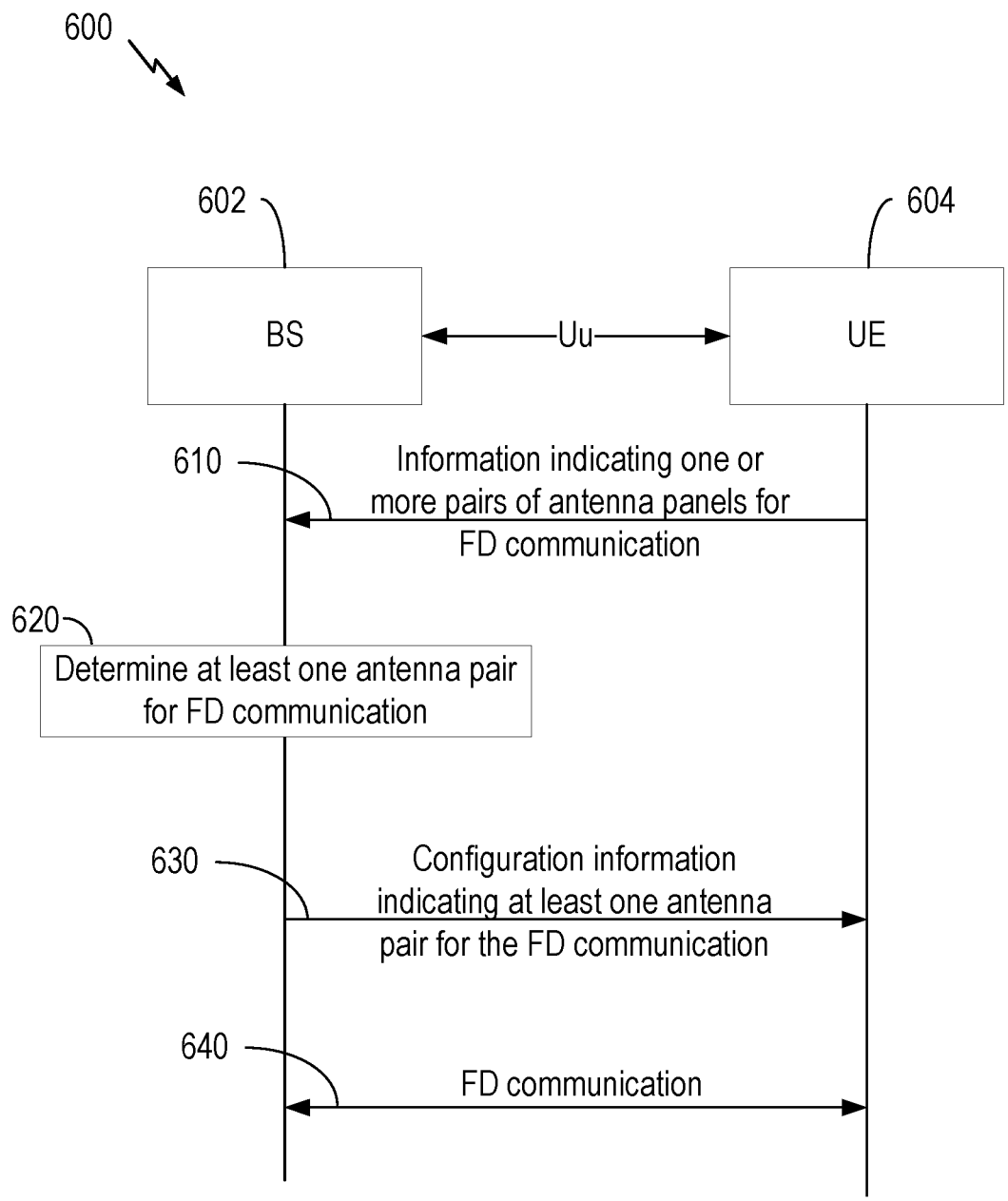
FIG. 6 is a call flow diagram illustrating example operations between a base station and a user equipment for reporting and configuring pairs of antenna panels of the user equipment for full-duplex communication.
Figure 7:
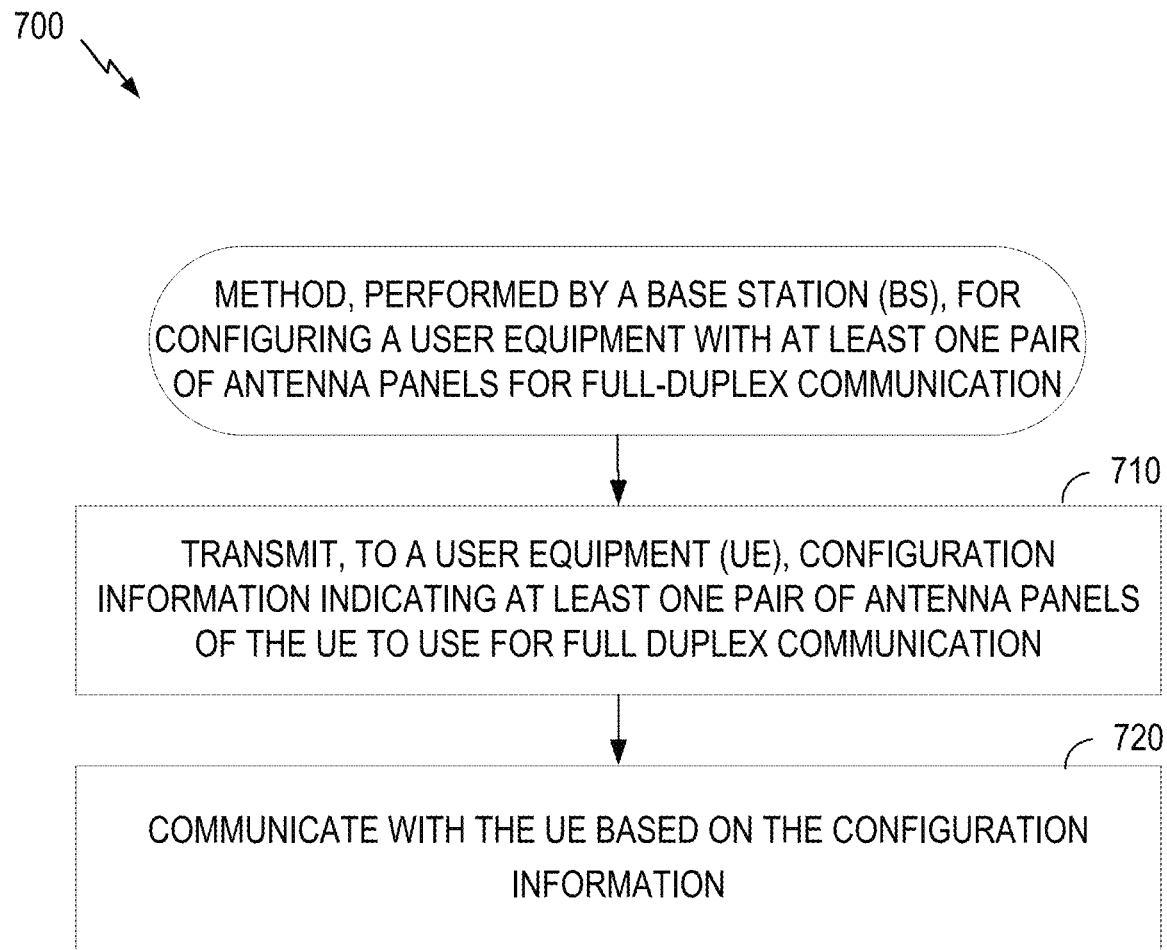
FIG. 7 is a flow diagram illustrating example operations for wireless communication by a base station.

Wireless communication network 100 includes full-duplex (FD) communication component 199, which may be configured to perform the operations illustrated in one or more of FIGS. 6-7, as well as other operations described herein for reporting and configuring antenna panel pairs for full-duplex communication. Wireless communication network 100 further includes FD communication component 198, which may be configured to perform the operations illustrated in one or more of FIG. 6 or 8, as well as other operations described herein for reporting and configuring antenna panel pairs for full-duplex communication.

Figure 2:
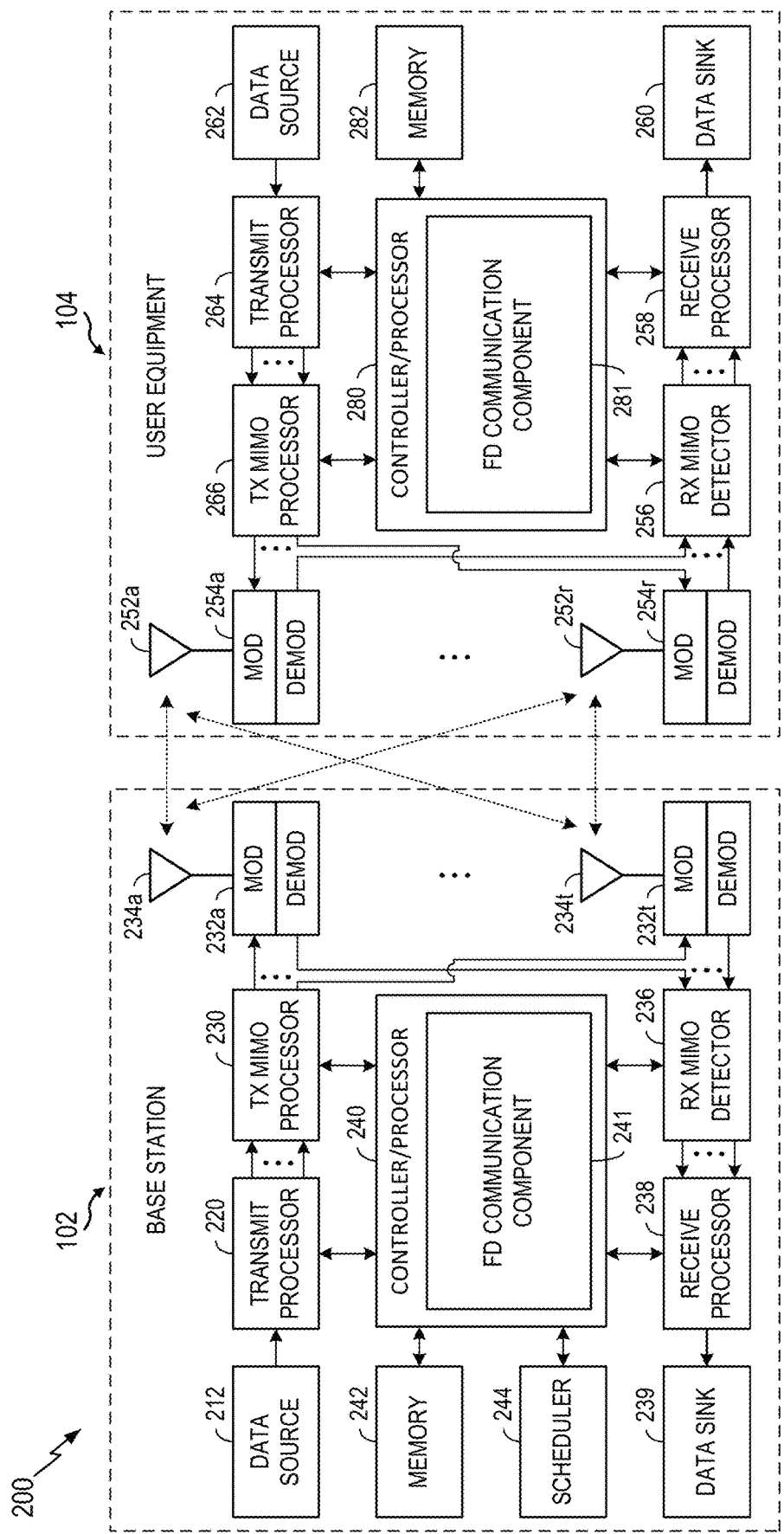
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes FD communication component 241, which may be representative of FD communication component 199 of FIG. 1. Notably, while depicted as an aspect of controller/processor 240, FD communication component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes FD communication component 281, which may be representative of FD communication component 198 of FIG. 1. Notably, while depicted as an aspect of controller/processor 280 FD communication component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Introduction to Multi Antenna Panel Communication

In certain systems, such as the wireless communication network 100 of FIG. 1, UEs and BSs may be able to transmit or receive transmissions using multiple antennas, beams, and/or antenna panels (e.g., antenna element arrays). An antenna panel may comprise a collection of transceiver units (TXRUs) that are capable of generating an analog beam. In some cases, when a dual-polarized array is used, the one beam may correspond to two antenna ports. In some cases, same sets or different sets of antenna panels can be used for DL reception and UL transmission. For example, in some cases, the same set of antenna panels may be used for both DL reception and UL transmission while in other cases different sets of antenna panels could be used for DL reception as compared to UL transmission.

Additionally, antenna panels can be associated with the same as well as different numbers of antenna ports, a number of beams, and/or an effective isotropic radiated power (EIRP). In some cases, while different antenna panels may share a same number of beams, there may not be beam correspondence across different antenna panels. Further, in some cases, each antenna panel may be associated with the same or independent operation parameters, such as power control (PC) parameters, a fast Fourier transform timing window, a time advance (TA) parameter, and the like. Additionally, each antenna panel of the UE may be associated with a particular panel identifier (ID) or an antenna panel group ID. In some cases, the antenna panel ID or antenna panel group ID may include one or more of a beam group ID, a transmission configuration indicator (TCI) state pool ID, a sounding reference signal (SRS) resource group ID, a control resource set (CORESET) pool ID, or a closed loop power control index.

In some cases, the capability to perform transmissions using multiple panels may be especially useful for higher frequency transmission, such as millimeter wave transmissions described above. In some cases, the transmissions associated with a UE may be received from or transmitted to a serving BS or transmission reception point (TRP) via a Uu interface. Generally, transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel transmissions.

Aspects Related to Antenna Panel Pair Reporting and Configuration for Full-Duplex Communication As noted above, in some cases, wireless communication devices, such as UEs and BSs, may communicate using multiple antenna panels. In some cases, the multiple antenna panels may be used for half-duplex (HD) communication, such as in current 5G new radio (NR) communication systems, in which downlink (DL) and uplink (UL) transmissions are transmitted non-simultaneously (e.g., transmitted in different time resources). HD communication may be considered baseline behavior in Release 15 (R-15) and 16 (R-16) of 5G NR. In other cases, the use of multiple antenna panels may allow for full duplex (FD) communication whereby uplink (UL) and downlink (DL) transmissions may be performed simultaneously (e.g., in the same time resources). For example, in some cases, UL transmission by the UE may be performed on one panel while DL reception may be performed simultaneously on another panel of the UE. Likewise, at a BS, DL transmission by the BS may be performed on one antenna panel while UL reception may be performed on another antenna panel.

FD capability may be conditioned on beam separation (e.g., frequency separation or spatial separation) and may still be subject to certain self-interference between UL and DL (e.g., UL transmission directly interferes with DL reception) as well as clutter echo (e.g., where UL transmission echoes affect UL transmission and/or DL reception). However, while FD capability may be subject to certain interference, FD capability provides for reduced transmission and reception latency (e.g., it may be possible to receive DL transmissions in an UL-only slot), increased spectrum efficiency (e.g., per cell and/or per UE), and more efficient resource utilization.

Figure 4A:
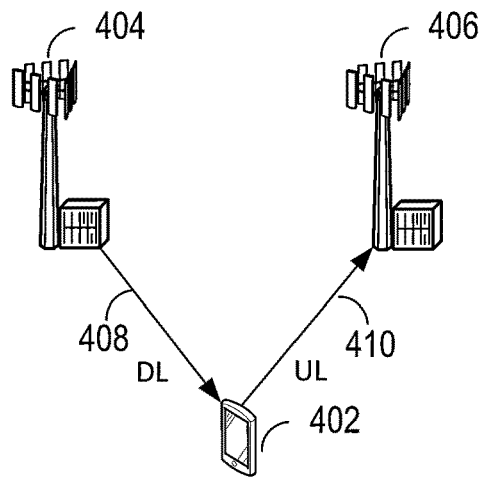
FIGS. 4A-4C illustrates different full-duplex use cases within a wireless communication network.
Figure 4B:
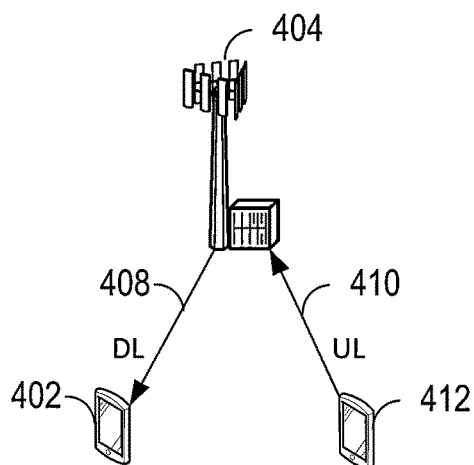
Figure 4C:
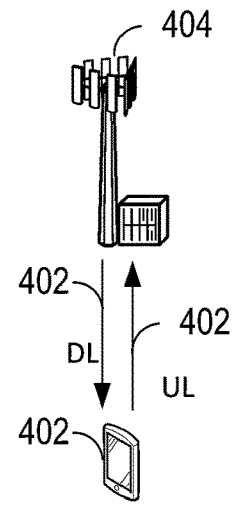

FIGS. 4A-4C illustrates different FD use cases within a wireless communication network, such as the wireless communication network 100. For example, FIG. 4A illustrates a first FD use case involving transmission between one UE 402 and two base stations (or multiple transmission reception points (mTRP)), BS 404 and BS 406. In some cases, UE 402 may be representative of UE 104 of FIG. 1 and BSs 404, 406 may be representative of BS 102 of FIG. 1. As shown, the UE 402 may simultaneously receive DL transmissions 408 from the BS 404 and transmit UL transmissions 410 to the BS 406. In some cases, the DL transmissions 408 and UL transmissions 410 may be performed using different antenna panels to facilitate the simultaneous transmission and reception.

A second FD use case is illustrated in FIG. 4B involving two different UEs and one BS. As illustrated, the UE 402 may receive DL transmissions 408 from the BS 404 while another UE 412 may simultaneously transmit UL transmission 410 to the BS 404. Thus, in this example, BS 404 is conducting simultaneous uplink and downlink communications.

A third FD use case is illustrated in FIG. 4C involving one BS and one UE. As illustrated, the UE 402 may receive DL transmissions 408 from the BS 404 and may simultaneously transmit UL transmissions 410 to the BS 404. As noted above, such simultaneous reception/transmission by the UE 402 may be facilitated by different antenna panels.

Table 1, below, illustrates various example scenarios in which each of the FD use cases may be used.

TABLE 1

| Base Station | UE | FD use case |
| --- | --- | --- |
| FD disabled | FD disabled | Baseline R-15/16 5G behavior |
| FD disabled | FD enabled | Use case #1 (FIG. 4A) for mTRP |
| FD enabled | FD disabled | Use case #2 (FIG. 4B) + R-16 IAB |
| FD enabled | FD enabled | Use case #3 (FIG. 4C) |

As shown, if FD capability is disabled at both the base station and UE, the baseline R-15 and R-16 5G behavior may be used (e.g., HD communication). If FD capability is disabled at the BS but enabled at the UE, the UE may operate according to the first example FD use case shown in FIG. 4A in which the UE may communicate with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 4B in which the BS may communicate with two different UEs simultaneously (e.g., simultaneous UL and DL transmissions) using two different antenna panels. Finally, if FD is enabled at both the BS and the UE, the BS and UE may operate according to the third example FD use case shown in FIG. 4C in which the BS and UE may communicate with each other simultaneously on the UL and DL, each of the BS and UE using different antenna panels for UL and DL transmissions.

FD communication may be facilitated through the use of frequency division multiplexing (FDM) or spatial division multiplexing (SDM). In FDM, the simultaneous UL and DL transmissions may be transmitted in the same time resources but on separate frequency bands separated by some guard band. In SDM, the simultaneous UL and DL transmissions may transmitted on the same time and frequency resources but spatially separated into different, directional transmission beams. Such FD communication contrasts with HD communication that uses time division multiplexing (TDM) in which UL and DL transmissions are scheduled on the same or different frequency resources, but different time resources.

Figure 5:
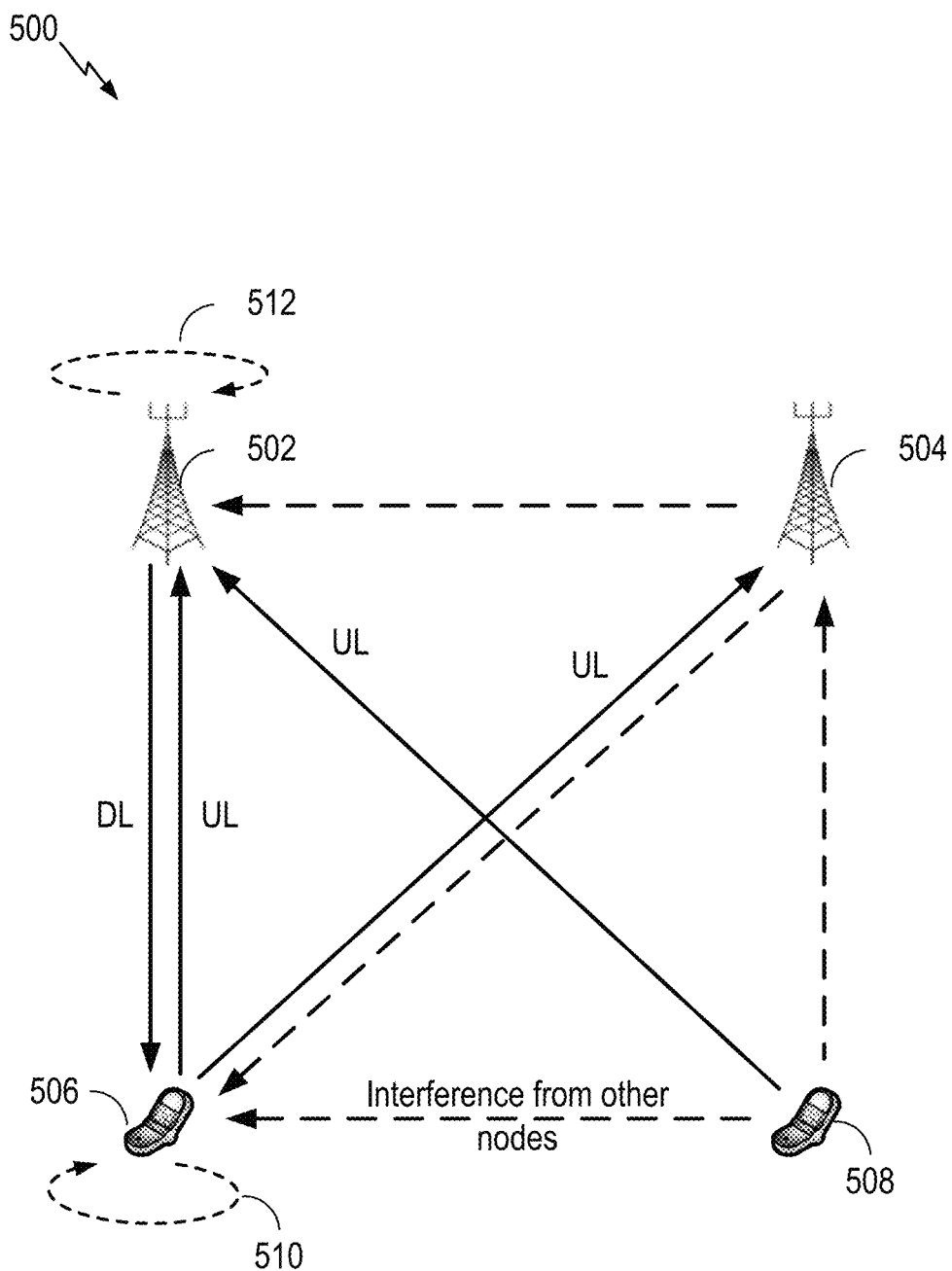
FIG. 5 illustrates interference scenarios that may occur within a wireless communications network.

As noted above, FD communication provides for reduced transmission and reception latency and increased spectrum efficiency; however, wireless communications devices that use FD communication may still be susceptible to certain interferences, such as self-interferences caused between antenna panels used for uplink and downlink transmissions. Similarly, wireless communications devices that are capable of using FD communication may also be susceptible to interference from neighboring wireless communications devices. FIG. 5 illustrates interference scenarios that may occur within a wireless communications network 500 in which FD and HD communications may be used. In some cases, the wireless communications network 400 may be an example of the wireless communications network 100 of FIG. 1.

As shown in FIG. 5, wireless communication may occur between a plurality of wireless communication devices, such as BS 502, BS 504, UE 506, and UE 508. In some cases BS 502 and UE 506 may be capable of FD communication while BS 504 and UE 508 may only be capable of HD communication. As such, HD and FD communication may be intermixed in the wireless communication network 400. Such intermixed HD and FD communication may include communication between an FD UE and an HD BS (e.g., UE 506 and BS 504), between an FD BS and an HD UE (e.g., BS 502 and UE 508), and between an FD BS and an FD UE (e.g., BS 502 and UE 506).

In some cases, as noted above, wireless communications devices that are capable of using FD communication, such as BS 502 and UE 506, may be susceptible to interference from neighboring wireless communications devices. In the example illustrated in FIG. 5, FD-capable UE 506 may be susceptible to interference from neighboring UE 508 as well as neighboring BS 504. Similarly, in the example illustrated in FIG. 5, FD-capable BS 502 may be susceptible to interference from neighboring BS 504.

Moreover, FD-capable BS 502 and FD-capable UE 506 may also be susceptible to self-interference between antenna panels used for FD communication. For example, as illustrated, UE 506 may experience self-interference 510 between antenna panels used for FD communication with the BS 502 and/or BS 504. More specifically, for example, the UE 506 may experience self-interference 510 between an antenna panel used for receiving downlink transmissions from the BS 502 and an antenna panel used for transmitting uplink transmissions to the BS 502 and/or BS 504. Similarly, the BS 502 may experience self-interference 512 between an antenna panel used for receiving uplink transmissions from the UE 506 and an antenna panel used for transmitting downlink transmissions the UE 506.

This self-interference that may be experienced by wireless communications devices that are capable of FD communication is undesirable and can lead to negative effects. These negative effects may include transmissions that cannot be properly received or decoded, which may lead to wasted time and frequency resources within the wireless communication network 500, as well as wasted power resources at a transiting device and receiving device, associated with having to retransmit/re-receive the transmissions that were not previously properly received/decoded due to the self-interference between antenna panels.

Accordingly, aspects of the present disclosure provide techniques to help reduce self-interference experienced by wireless communications devices that are capable of FD communication. For example, in some cases, such techniques may include a UE reporting, to a BS, antenna panel information indicating one or more pairs of antenna panels that are capable of FD communication. In some cases, the one or more pairs of antenna panels that are capable of the FD communication may include pairs of antenna panels that do not (or minimally) interfere with each other. The BS may then determine a pair of antenna panels of the UE for the FD communication and provide configuration information to the UE that configures the UE to use the determined pair of antenna panels. In some cases, the BS may determine the pair of antenna panels based on at least one of the antenna panel information from the UE, beam management reports from the UE, or uplink reference signal measurements.

Thereafter, the BS may transmit configuration information to the UE, indicating at least one pair of antenna panels of the UE to use FD communication. The UE may then use the at least one pair of antenna panels for the FD communication with the BS.

By reporting pairs of antenna panels that are capable of FD communication and configuring the UE to use at least one of these pairs of antenna panels, self-interference at the UE may be reduced. By reducing self-interference at the UE, reliability of uplink and downlink transmissions may be improved, thereby reducing the chances that these transmissions are not properly received/decoded. Accordingly, time and frequency resources within the wireless communications network, as well as power resources at the UE and BS, may be conserved as retransmissions of these uplink and downlink transmissions may not be necessary.

Example Call Flow Illustrating Operations for Antenna Panel Pair Reporting and Configuration for Full-Duplex Communication FIG. 6 is a call flow diagram illustrating example operations 600 between a BS 602 and a UE 604 for reporting and configuring pairs of antenna panels of the UE 604 for FD communication. In some cases, the BS 602 may be an example of the BS 102 in the wireless communication network 100 illustrated in FIG. 1. Similarly, the UE 604 may be an example of the UE 104 illustrated in FIG. 1 and may include a plurality of antenna panels that may be used for FD communication. Further, as shown, a Uu interface may be established to facilitate communication between the BS 602 and UE 604, however, in other aspects, a different type of interface may be used.

As shown, the operations 600 illustrated in FIG. 6 begin at 610 with the UE 604 transmitting, to the BS 602, antenna panel information indicating one or more pairs of antenna panels that are capable of full duplex communication with the BS. In some cases, the UE 604 may the antenna panel information indicating the one or more pairs of antenna panels that are capable of full duplex communication includes pairs of antenna panel identifiers corresponding to the one or more pairs of antenna panels that are capable of full duplex communication. In other words, the UE 604 may identify the one or more pairs of antenna panels by including pairs of antenna panel identifiers within the antenna panel information. In some cases, the antenna panel information may include a pair of antenna group IDs identifying the one or more pairs of antenna panels that are capable of the full duplex communication. In some cases, the antenna panel information includes a pair of beam group IDs identifying the one or more pairs of antenna panels that are capable of the full duplex communication.

In some cases, the one or more pairs of antenna panels that are capable of full duplex communication with the BS 602 may include pairs of antenna panels of the UE 604 having signal metrics above a threshold. In other words, the UE 604 may determine the one or more pairs of antenna panels based on the signal metrics associated with the one or more pairs of antenna panels. In some cases, the antenna panel information indicating one or more pairs of antenna panels that are capable of full duplex communication may include an indication of the signal metrics associated with the one or more pairs of antenna panels.

In some cases, the signal metrics may include a signal to noise plus interference ratio (SINR) metric associated with the one or more pairs of antenna panels. For example, the UE 604 may perform one or more SINR measurements associated with different combinations of antenna panels and determine the one or more pairs of antenna panels with a SINR metric above a threshold. As an example, assuming the UE 604 includes six antenna panels, the UE 604, in some cases, may determine that a first pair of antenna panels including antenna panel #1 and antenna panel #3 can support FD communication based on antenna panel #1 and antenna panel #3 being associated with an SINR above a threshold. Similarly, the UE 604 may determine a second pair of antenna panels including antenna panel #2 and antenna panel #4 can support FD communication, and a third pair of antenna panels including antenna panel #5 and antenna panel #6 can support FD communication. In some cases, the UE 604 may determine the one or more pairs of antenna panels based on other signal metrics, such as a downlink reference signal received power (RSRP) and/or an uplink power headroom report (PHR) metric.

In some cases, the UE 604 may be configured to only report a subset, N, of a plurality of pairs of antenna panels that are capable of the FD communication. For example, in some cases, the UE 604 may report the top N pairs of antenna panels in the antenna panel information having the highest measured signal metrics (e.g., pairs of antenna panels having signal metrics above a threshold). In some cases, a number of pairs of antenna panels to include in the subset, N, may be obtained by the UE 604 in different manners. For example, the UE 604 may obtain an indication of the number of pairs of antenna panels to include in the subset from at least one of pre-configuration information stored in the UE 604 (e.g., configuration information installed in the UE 604 by a manufacturer), a radio resource control (RRC) message received from the BS 602, a media access control-control element (MAC CE) received from the BS 602, or downlink control information (DCI) received from the BS 602.

In some cases, the UE 604 may also include, in the antenna panel information, one or more beam pairs, associated with the one or more pairs of antenna panels, for performing the full duplex communication. For example, as noted above, in some cases, simultaneous UL and DL transmissions may transmitted on the same time and frequency resources but spatially separated into different, directional transmission beams. Accordingly, each beam pair of the one or more beam pairs reported by the UE 604 in the antenna panel information may include a first beam, associated with a first antenna panel of the one or more pairs of antenna panels, for receiving downlink transmissions from the BS 602 and a second beam, associated with a second antenna panel of the one or more pairs of antenna panels, for transmitting uplink transmissions to the BS 602.

In some cases, the UE 604 may determine the one or more beam pairs based on signal metrics, such as SINR metrics. For example, in some cases, the UE 604 may measure SINR associated with different beam pairs of a plurality of all possible beam pairs and select beam pairs that are associated with a SINR that is greater than or equal to a threshold. In some cases, the threshold may be pre-defined as an event trigger threshold in a wireless standard. In other cases, the UE 604 may receive an indication of the threshold in at least one of an RRC message from the BS 602, a MAC CE from the BS 602, or DCI from the BS 602.

Further, in some cases, the UE 604 may be configured to report a subset of beam pairs that are associated with signal metrics above the threshold. For example, in some cases, the UE 604 may report only the top two beam pairs of four total beam pairs having signal metrics above the threshold. In some cases, a number of beam pairs to include in the subset may be obtained by the UE 604 in different manners. For example, the UE 604 may obtain an indication of the number of beam pairs to include in the subset from at least one of pre-configuration information stored in the UE 604 (e.g., configuration information installed in the UE 604 by a manufacturer), a radio resource control (RRC) message received from the BS 602, a media access control-control element (MAC CE) received from the BS 602, or downlink control information (DCI) received from the BS 602.

As shown at 620 in FIG. 6, the BS 602 may determine at least one pair of antenna panels of the UE 604 to use for the FD communication. In some cases, the BS 602 may determine the at least one pair of antenna panels based on at least one of the antenna panel information from the UE 604 described above, a beam management report associated with the UE, or one or more uplink reference signals associated with the UE. In some cases, the at least one pair of antenna panels of the UE 604 to use for the FD communication may include a first antenna panel to use for receiving downlink transmissions from the BS 602 and a second antenna panel to use for transmitting uplink transmissions to the BS 602.

For example, with respect to determining the at least one pair of antenna panels based on a beam management report, the UE 604 may periodically perform beam measurements associated with one or more antenna panels. In some cases, these beam measurements may include, for example, downlink RSRP measurements associated with beams corresponding to one or more antenna panels of the UE. In some cases, these beam measurements may include SINR measurements associated with one or more beam pairs corresponding to one or more pairs of antenna panels of the UE.

The UE 604 may then transmit the beam management report, which may be received by the BS 602. As noted, the beam management report may include at least one of one or more downlink RSRP measurements associated with the beams corresponding to the one or more pairs of antenna panels of the UE or downlink SINR measurements associated with the one or more beam pairs corresponding to the one or more pairs of antenna panels of the UE. The BS 602 may then determine the at least one antenna pair for the FD communication in block 620 based on the one or more downlink RSRP measurements and/or the one or more downlink SINR measurements.

In some cases, as noted above, the BS 602 may determine the at least one pair of antenna panels based on one or more uplink reference signals associated with the UE 604. For example, the BS 602 may receive the one or more uplink reference signals from a plurality of antenna panels of the UE via a plurality of transmission reception points (TRPs) associated with the BS 602. In some cases, the one or more uplink reference signals may include sounding reference signals (SRSs) transmitted by the UE 604. Thereafter, the BS 602 may use the one or more uplink reference signals to perform one or more interference measurements associated with the plurality of antenna panels of the UE. The one or more interference measurements may indicate an interference caused between the plurality of TRPs by the received one or more uplink reference signals from the plurality of antenna panels of the UE. Thereafter, the BS 602 may determining the at least one pair of antenna panels in block 620 by selecting the at least one pair of antenna panels from the plurality of antenna panels of the UE based on the one or more interference measurements.

Thereafter, at 630 in FIG. 6, once the BS 602 has determined the at least one antenna panel for the FD communication, the BS 602 transmits, to the UE 604, configuration information indicating the at least one pair of antenna panels of the UE 604 to use for the FD communication. In some cases, the BS 602 transmits the configuration information to the UE 604 in at least one of a radio resource control (RRC) message, a media access control-control element (MAC CE), or downlink control information (DCI). Additionally, in some cases, the configuration information includes at least one of one or more panel IDs associated with the at least one pair of antenna panels or one or more antenna ports associated with the at least one pair of antenna panels. For example, the one or more panel IDs may include a first panel ID associated with the first antenna panel for receiving the downlink transmissions from the BS 602 and a second panel ID associated with the second antenna panel for transmitting uplink transmissions to the BS 602. Further, in some cases, the at least one pair of antenna panels indicated in the configuration information may include a default pair of antenna panels to use for the FD communication.

Thereafter, as shown at 640, the BS 602 and UE 604 may communicate with each other based on the configuration information. In other words, for example, the UE 604 may use the at least one pair of antenna panels for the full duplex communication with the BS 602. For example, using the at least one pair of antenna panels for the full duplex communication may include simultaneously receiving downlink transmissions using the first antenna panel of the at least one pair of antenna panels indicated in the configuration information and transmitting uplink transmissions using the second antenna panel of the at least one pair of antenna panels indicated in the configuration information.

Example Methods for Reporting and Configuring
Antenna Panel Pairs for Full-Duplex
Communication FIG. 7 is a flow diagram illustrating example operations 700 for wireless communication. The operations 700 may be performed, for example, by a BS (e.g., such as the BS 102 in the wireless communication network 100 of FIG. 1) for configuring a user equipment with at least one pair of antenna panels for FD communication. The operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 begin, at 710, with transmitting, to a user equipment (UE), configuration information indicating at least one pair of antenna panels of the UE to use for full duplex communication.

In block 720, the BS communicates with the UE based on the configuration information.

In some cases, operations 700 may further include determining the at least one pair of antenna panels based on at least one of antenna panel information associated with the UE, a beam management report associated with the UE, or one or more uplink reference signals associated with the UE.

In some cases, operations 700 may further include receiving the beam management report from the UE, wherein the beam management report includes information that indicates at least one of: one or more downlink reference signal received power (RSRP) measurements associated with beams corresponding to one or more antenna panels of the UE, or downlink signal-to-interference-plus-noise (SINR) ratio measurements associated with one or more beam pairs corresponding to one or more pairs of antenna panels of the UE.

In some cases, operations 700 may further include receiving the one or more uplink reference signals from a plurality of antenna panels of the UE via a plurality of transmission reception points (TRPs) associated with the base station. In some cases, operations 700 may further include performing one or more interference measurements associated with the plurality of antenna panels of the UE, wherein the one or more interference measurements indicate an interference caused between the plurality of TRPs by the received one or more uplink reference signals from the plurality of antenna panels of the UE.

In some cases, determining the at least one pair of antenna panels based on the one or more uplink reference signals associated with the UE comprises selecting the at least one pair of antenna panels from the plurality of antenna panels of the UE based on the one or more interference measurements.

In some cases, the one or more uplink reference signals comprise sounding reference signals (SRSs).

In some cases, operations 700 may further include receiving, from the UE, the antenna panel information, wherein the antenna panel information indicates one or more pairs of antenna panels that are capable of the full duplex communication.

In some cases, the one or more pairs of antenna panels that are capable of full duplex communication comprise pairs of antenna panels having signals metric above a threshold.

In some cases, the antenna panel information indicating the one or more pairs of antenna panels that are capable of full duplex communication comprises an indication of the signal metrics associated with the pairs of antenna panels of the one or more pairs of antenna panels.

In some cases, the antenna panel information indicating the one or more pairs of antenna panels that are capable of full duplex communication comprises at least one of: a pair of antenna panel identifiers (IDs) identifying the one or more pairs of antenna panels that are capable of the full duplex communication, a pair of antenna group IDs identifying the one or more pairs of antenna panels that are capable of the full duplex communication, or a pair of beam group IDs identifying the one or more pairs of antenna panels that are capable of the full duplex communication.

In some cases, the one or more pairs of antenna panels comprise a subset of a plurality of pairs of antenna panels of the UE that are capable of the full duplex communication.

In some cases, operations 700 may further include transmitting an indication of a number of pairs of antenna panels to include in the subset in the subset from at least one of reconfiguration information stored in the UE, a radio resource control (RRC) message, a media access control-control element (MAC CE), or downlink control information (DCI).

In some cases, the antenna panel information further includes one or more beam pairs, associated with the one or more pairs of antenna panels, for performing the full duplex communication.

In some cases, each beam pair of the one or more beam pairs includes: a first beam, associated with a first antenna panel of the one or more pairs of antenna panels, for receiving downlink transmissions from the BS, and a second beam, associated with a second antenna panel of the one or more pairs of antenna panels, for transmitting uplink transmissions to the BS.

In some cases, one or more beam pairs comprise pairs of beams having a signal metric above a threshold.

In some cases, operations 700 may further include transmitting an indication of the threshold in at least one of a radio resource control (RRC) message, a media access control-control element (MAC CE), or downlink control information (DCI).

In some cases, communicating with the UE based on the configuration information in block 720 comprises simultaneously transmitting downlink transmissions associated with a first antenna panel of the at least one pair of antenna panels and receiving uplink transmissions associated a second antenna panel of the at least one pair of antenna panels.

In some cases, transmitting the configuration information comprises transmitting the configuration information in at least one of a radio resource control (RRC) message, a media access control-control element (MAC CE), or downlink control information (DCI).

In some cases, the configuration information includes at least one of one or more panel IDs associated with the at least one pair of antenna panels or one or more antenna ports associated with the at least one pair of antenna panels.

In some cases the at least one pair of antenna panels comprises a default pair of antenna panels.

Figure 8:
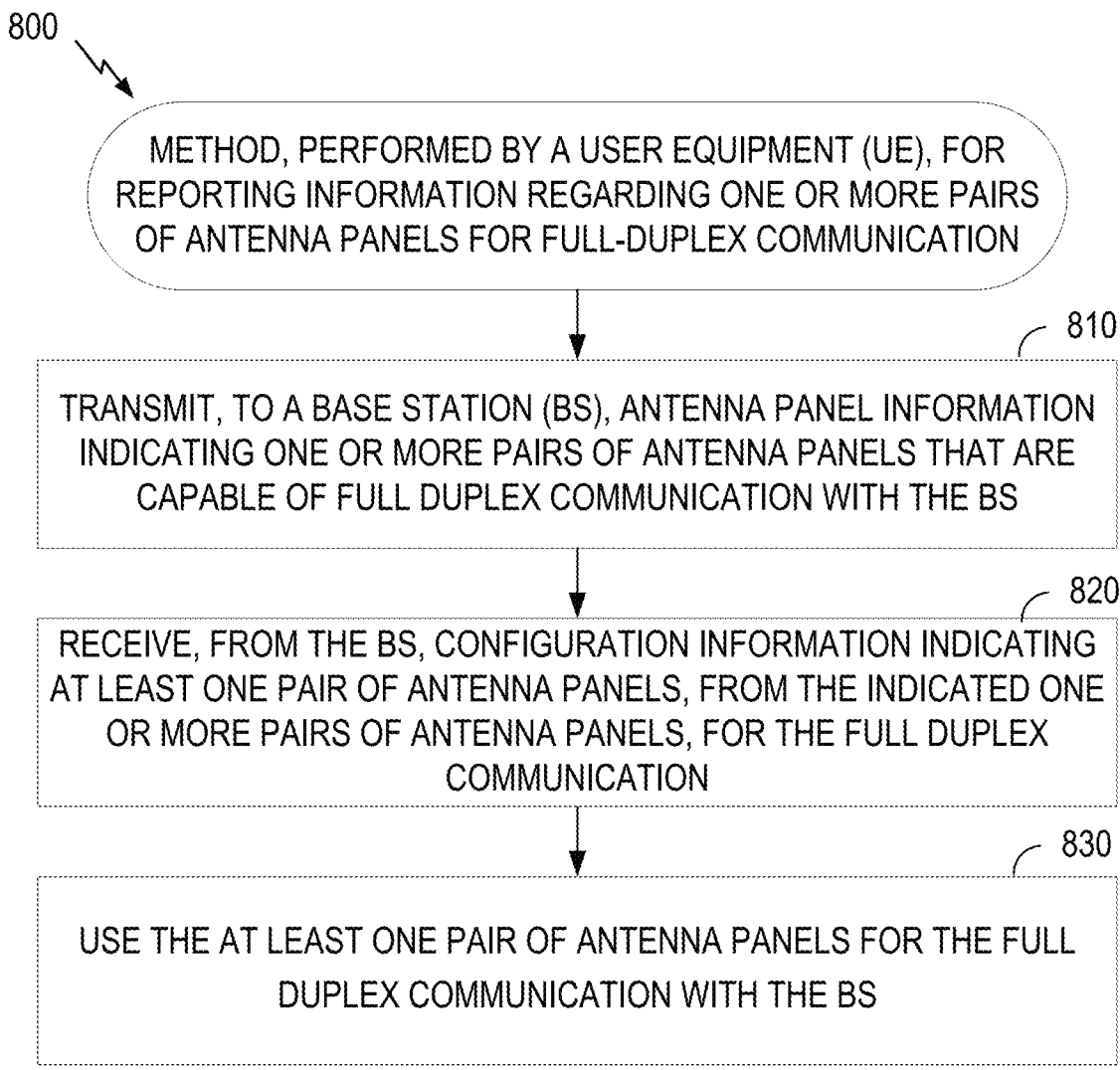
FIG. 8 is a flow diagram illustrating example operations for wireless communication by a user equipment.

FIG. 8 is a flow diagram illustrating example operations 800 for wireless communication, in accordance with certain aspects of the present disclosure. The operations 800 may be performed, for example, by a UE (e.g., such as the UE 104 in the wireless communication network 100 of FIG. 1) for reporting antenna panel information regarding one or more pairs of antenna panels for FD communication. The operations 800 may be complementary to the operations 700 performed by the BS. The operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 begin, at 810, with transmitting, to a base station (BS), antenna panel information indicating one or more pairs of antenna panels that are capable of full duplex communication with the BS.

In block 820, the UE receives, from the BS, configuration information indicating at least one pair of antenna panels, from the indicated one or more pairs of antenna panels, for the full duplex communication.

In block 830, the UE using the at least one pair of antenna panels for the full duplex communication with the BS.

In some cases, the one or more pairs of antenna panels that are capable of full duplex communication with the BS comprise pairs of antenna panels having a signals metric above a threshold.

In some cases, the antenna panel information indicating the one or more pairs of antenna panels that are capable of full duplex communication comprises at least one of: a pair of antenna panel identifiers (IDs) identifying the one or more pairs of antenna panels that are capable of the full duplex communication, a pair of antenna group IDs identifying the one or more pairs of antenna panels that are capable of the full duplex communication, or a pair of beam group IDs identifying the one or more pairs of antenna panels that are capable of the full duplex communication.

In some cases, operations 800 may further include determining the one or more pairs of antenna panels based on signal metrics associated with the one or more pairs of antenna panels.

In some cases, the signal metrics comprise at least one of: a signal-to-interference-plus-noise (SINR) ratio metric; a downlink reference signal received power (RSRP) metric; or an uplink power headroom report (PHR) metric.

In some cases, the antenna panel information indicating one or more pairs of antenna panels that are capable of full duplex communication comprises an indication of the signal metrics associated with the one or more pairs of antenna panels.

In some cases, the one or more pairs of antenna panels comprise a subset of a plurality of pairs of antenna panels that are capable of the full duplex communication.

In some cases, operations 800 may further include obtaining an indication of a number of pairs of antenna panels to include in the subset in the subset from at least one of reconfiguration information stored in the UE, a radio resource control (RRC) message, a media access control-control element (MAC CE), or downlink control information (DCI). In some cases, operations 800 may further include including the indicated number of pairs of antenna panels in the subset.

In some cases, the antenna panel information further includes one or more beam pairs, associated with the one or more pairs of antenna panels, for performing the full duplex communication.

In some cases, each beam pair of the one or more beam pairs includes: a first beam, associated with a first antenna panel of the one or more pairs of antenna panels, for receiving downlink transmissions, and a second beam, associated with a second antenna panel of the one or more pairs of antenna panels, for transmitting uplink transmissions.

In some cases, one or more beam pairs comprise pairs of beams having a signal metric above a threshold.

In some cases, operations 800 may further include receiving an indication of the threshold in at least one of a radio resource control (RRC) message, a media access control-control element (MAC CE), or downlink control information (DCI).

In some cases, using the at least one pair of antenna panels for the full duplex communication in block 830 comprises simultaneously receiving downlink transmissions using a first antenna panel of the at least one pair of antenna panels and transmitting uplink transmissions using a second antenna panel of the at least one pair of antenna panels.

In some cases, receiving the configuration information in block 820 comprises receiving the configuration information in at least one of a radio resource control (RRC) message, a media access control-control element (MAC CE), or downlink control information (DCI).

In some cases, the configuration information includes at least one of one or more panel IDs associated with the at least one pair of antenna panels or one or more antenna ports associated with the at least one pair of antenna panels.

In some cases, the at least one pair of antenna panels comprises a default pair of antenna panels.

Example Wireless Communication Devices

Figure 9:
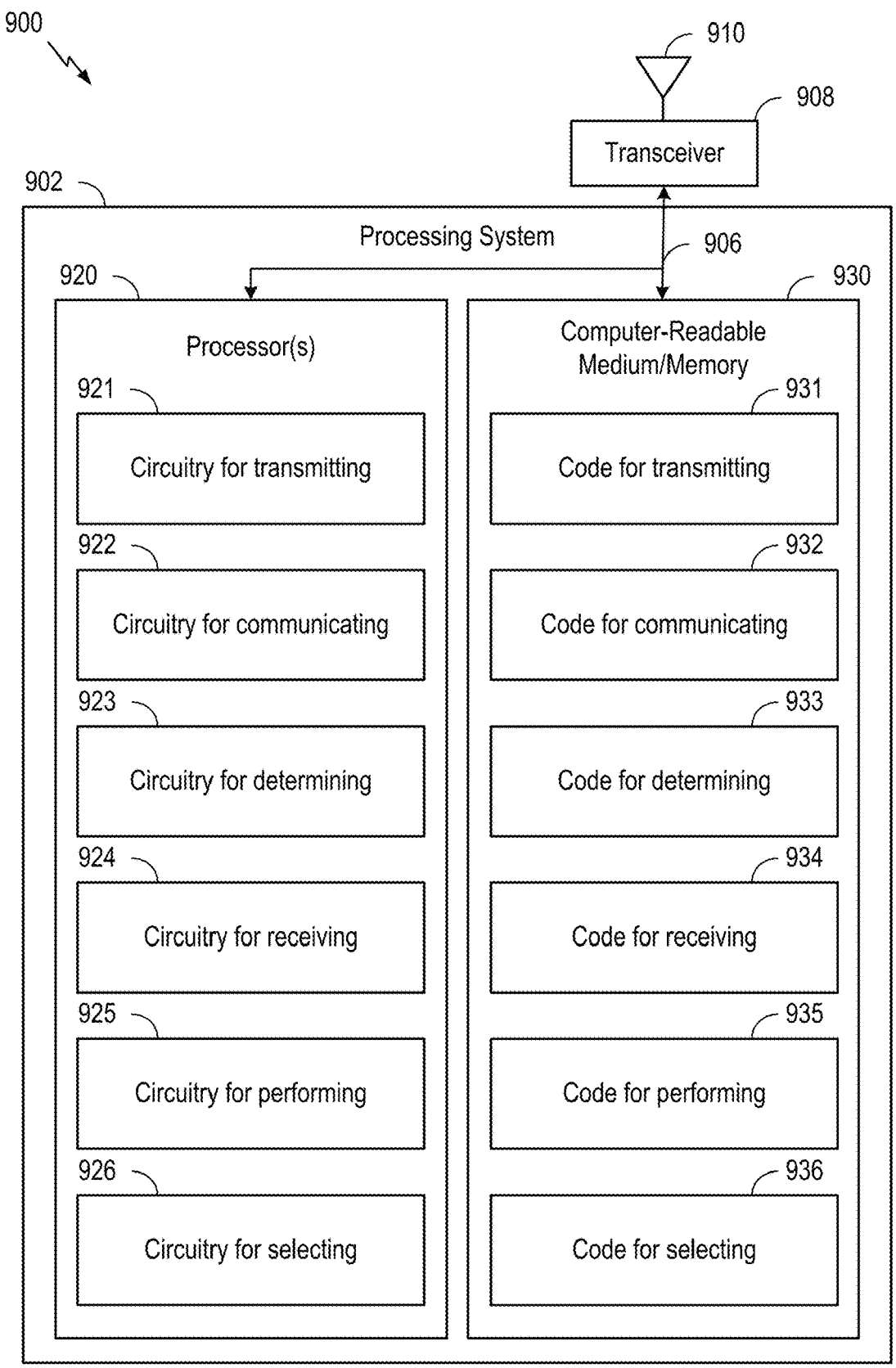
FIG. 9 depicts aspects of an example communications device.

FIG. 9 depicts an example communications device 900 that includes various components operable, configured, or adapted to perform operations for the techniques disclosed herein, such as the operations depicted and described with respect to FIGS. 6-7. In some examples, communication device 900 may be a base station 102 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIGS. 6-7, or other operations for performing the various techniques discussed herein for configuring a user equipment with at least one pair of antenna panels for FD communication.

In the depicted example, computer-readable medium/memory 930 stores code 931 for transmitting, code 932 for communicating, code 933 for determining, code 934 for receiving, code 935 for performing, and code 936 for selecting.

In the depicted example, the one or more processors 920 include circuitry configured to implement the code stored in the computer-readable medium/memory 930, including circuitry 921 for transmitting, circuitry 922 for communicating, circuitry 923 for determining, circuitry 924 for receiving, circuitry 925 for performing, and circuitry 926 for selecting.

Various components of communications device 900 may provide means for performing the methods described herein, including with respect to FIGS. 6-7.

In some examples, means for transmitting or sending (or means for outputting for transmission), as well as means for communicating, may include the transceivers 232 and/or antenna(s) 234 of the base station 102 illustrated in FIG. 2 and/or transceiver 908 and antenna 910 of the communication device 900 in FIG. 9.

In some examples, means for receiving (or means for obtaining), as well as means for communicating, may include the transceivers 232 and/or antenna(s) 234 of the base station illustrated in FIG. 2 and/or transceiver 908 and antenna 910 of the communication device 900 in FIG. 9.

In some examples, means for determining, means for performing, and means for selecting may include various processing system components, such as: the one or more processors 920 in FIG. 9, or aspects of the base station 102 depicted in FIG. 2, including receive processor 238, transmit processor 220, TX MIMO processor 230, and/or controller/processor 240 (including FD communication component 241).

Notably, FIG. 9 is an example, and many other examples and configurations of communication device 900 are possible.

Figure 10:
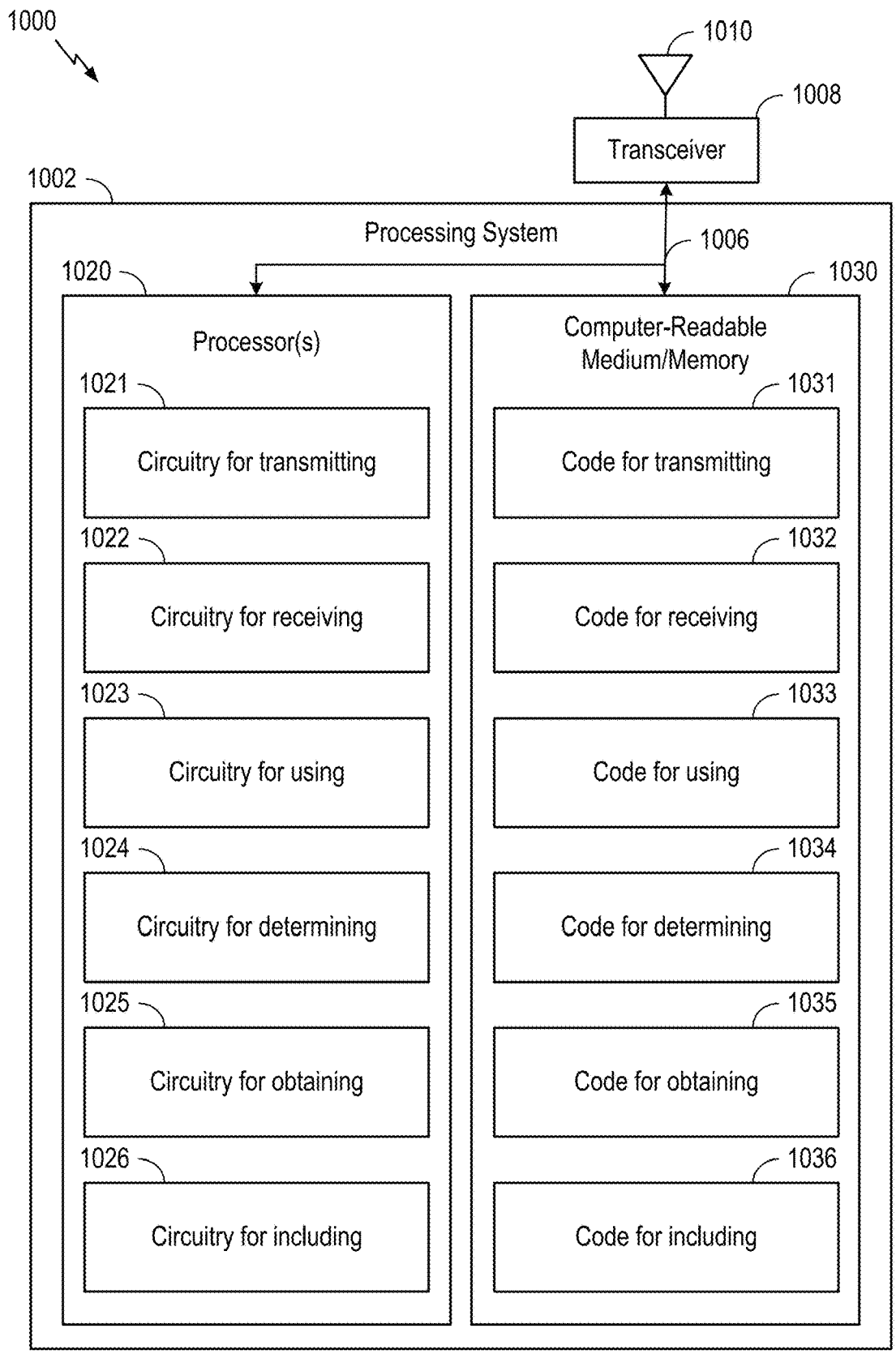
FIG. 10 depicts aspects of an example communications device.

FIG. 10 depicts an example communications device 1000 that includes various components operable, configured, or adapted to perform operations for the techniques disclosed herein, such as the operations depicted and described with respect to FIGS. 6 and 8. In some examples, communication device 1000 may be a user equipment 104 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIGS. 6 and 8, or other operations for performing the various techniques discussed herein for reporting antenna panel information regarding one or more pairs of antenna panels for FD communication.

In the depicted example, computer-readable medium/memory 1030 stores code 1031 for transmitting, code 1032 for receiving, code 1033 for using, code 1034 for determining, code 1035 for obtaining, and code 1036 for including.

In the depicted example, the one or more processors 1020 include circuitry configured to implement the code stored in the computer-readable medium/memory 1030, including circuitry 1021 for transmitting, circuitry 1022 for receiving, circuitry 1023 for using, circuitry 1024 for determining, circuitry 1025 for obtaining, and circuitry 1026 for including.

Various components of communications device 1000 may provide means for performing the methods described herein, including with respect to FIGS. 6 and 8.

In some examples, means for transmitting or sending (or means for outputting for transmission) may include the transceivers 254 and/or antenna(s) 252 of the user equipment 104 illustrated in FIG. 2 and/or transceiver 1008 and antenna 1010 of the communication device 1000 in FIG. 10.

In some examples, means for receiving (or means for obtaining) may include the transceivers 254 and/or antenna(s) 252 of the user equipment 104 illustrated in FIG. 2 and/or transceiver 1008 and antenna 1010 of the communication device 1000 in FIG. 10.

In some examples, means for using, means for determining, and means for including may include various processing system components, such as: the one or more processors 1020 in FIG. 10, or aspects of the user equipment 104 depicted in FIG. 2, including receive processor 258, transmit processor 264, TX MIMO processor 266, and/or controller/processor 280 (including FD communication component 281).

Notably, FIG. 10 is an example, and many other examples and configurations of communication device 1000 are possible.

Example Clauses

Implementation examples are described in the following numbered clauses:

Clause 1: A method for wireless communication by a user equipment (UE), comprising: transmitting, to a base station (BS), antenna panel information indicating one or more pairs of antenna panels that are capable of full duplex communication with the BS; receiving, from the BS, configuration information indicating at least one pair of antenna panels, from the indicated one or more pairs of antenna panels, for the full duplex communication; and using the at least one pair of antenna panels for the full duplex communication with the BS.

Clause 2: The method of Clause 1, wherein the one or more pairs of antenna panels that are capable of full duplex communication with the BS comprise pairs of antenna panels having a signals metric above a threshold.

Clause 3: The method of any of Clauses 1-2, wherein the antenna panel information indicating the one or more pairs of antenna panels that are capable of full duplex communication comprises at least one of: a pair of antenna panel identifiers (IDs) identifying the one or more pairs of antenna panels that are capable of the full duplex communication, a pair of antenna group IDs identifying the one or more pairs of antenna panels that are capable of the full duplex communication, or a pair of beam group IDs identifying the one or more pairs of antenna panels that are capable of the full duplex communication.

Clause 4: The method of any of Clauses 1-3, further comprising determining the one or more pairs of antenna panels based on signal metrics associated with the one or more pairs of antenna panels.

Clause 5: The method of Clause 4, wherein the signal metrics comprise at least one of: signal-to-interference-plus-noise (SINR) ratio metric; a downlink reference signal received power (RSRP) metric; or an uplink power headroom report (PHR) metric.

Clause 6: The method of any of Clauses 4-5, wherein the antenna panel information indicating one or more pairs of antenna panels that are capable of full duplex communication comprises an indication of the signal metrics associated with the one or more pairs of antenna panels.

Clause 7: The method of any of Clauses 1-6, wherein the one or more pairs of antenna panels comprise a subset of a plurality of pairs of antenna panels that are capable of the full duplex communication.

Clause 8: The method of Clause 7, further comprising: obtaining an indication of a number of pairs of antenna panels to include in the subset in the subset from at least one of reconfiguration information stored in the UE, a radio resource control (RRC) message, a media access control-control element (MAC CE), or downlink control information (DCI); and including the indicated number of pairs of antenna panels in the sub set.

Clause 9: The method of any of Clauses 1-8, wherein the antenna panel information further includes one or more beam pairs, associated with the one or more pairs of antenna panels, for performing the full duplex communication.

Clause 10: The method of Clause 9, wherein each beam pair of the one or more beam pairs includes: a first beam, associated with a first antenna panel of the one or more pairs of antenna panels, for receiving downlink transmissions, and a second beam, associated with a second antenna panel of the one or more pairs of antenna panels, for transmitting uplink transmissions.

Clause 11: The method of any of Clauses 9-10, wherein one or more beam pairs comprise pairs of beams having a signal metric above a threshold.

Clause 12: The method of Clause 11, further comprising receiving an indication of the threshold in at least one of a radio resource control (RRC) message, a media access control-control element (MAC CE), or downlink control information (DCI).

Clause 13: The method of any of Clauses 1-12, wherein using the at least one pair of antenna panels for the full duplex communication comprises simultaneously receiving downlink transmissions using a first antenna panel of the at least one pair of antenna panels and transmitting uplink transmissions using a second antenna panel of the at least one pair of antenna panels.

Clause 14: The method of any of Clauses 1-13, wherein receiving the configuration information comprises receiving the configuration information in at least one of a radio resource control (RRC) message, a media access control-control element (MAC CE), or downlink control information (DCI).

Clause 15: The method of any of Clauses 1-14, wherein the configuration information includes at least one of one or more panel IDs associated with the at least one pair of antenna panels or one or more antenna ports associated with the at least one pair of antenna panels.

Clause 16: The method of any of Clauses 1-15, wherein the at least one pair of antenna panels comprises a default pair of antenna panels.

Clause 17: A method for wireless communication by a base station (BS), comprising: transmitting, to a user equipment (UE), configuration information indicating at least one pair of antenna panels of the UE to use full duplex communication; and communicating with the UE based on the configuration information.

Clause 18: The method of Clause 17, further comprising determining the at least one pair of antenna panels based on at least one of antenna panel information associated with the UE, a beam management report associated with the UE, or one or more uplink reference signals associated with the UE.

Clause 19: The method of Clause 18, further comprising receiving the beam management report from the UE, wherein the beam management report includes information that indicates at least one of: one or more downlink reference signal received power (RSRP) measurements associated with beams corresponding to one or more antenna panels of the UE, or downlink signal-to-interference-plus-noise (SINK) ratio measurements associated with one or more beam pairs corresponding to one or more pairs of antenna panels of the UE.

Clause 20: The method of any of Clauses 18-19, further comprising: receiving the one or more uplink reference signals from a plurality of antenna panels of the UE via a plurality of transmission reception points (TRPs) associated with the base station; and performing one or more interference measurements associated with the plurality of antenna panels of the UE, wherein the one or more interference measurements indicate an interference caused between the plurality of TRPs by the received one or more uplink reference signals from the plurality of antenna panels of the UE.

Clause 21: The method of Clause 20, wherein determining the at least one pair of antenna panels based on the one or more uplink reference signals associated with the UE comprises selecting the at least one pair of antenna panels from the plurality of antenna panels of the UE based on the one or more interference measurements.

Clause 22: The method of Clause 20, wherein the one or more uplink reference signals comprise sounding reference signals (SRSs).

Clause 23: The method of any of Clauses 18-22, further comprising receiving, from the UE, the antenna panel information, wherein the antenna panel information indicates one or more pairs of antenna panels that are capable of the full duplex communication.

Clause 24: The method of Clause 23, wherein the one or more pairs of antenna panels that are capable of full duplex communication comprise pairs of antenna panels having signals metric above a threshold.

Clause 25: The method of Clause 24, wherein the antenna panel information indicating the one or more pairs of antenna panels that are capable of full duplex communication comprises an indication of the signal metrics associated with the pairs of antenna panels of the one or more pairs of antenna panels.

Clause 26: The method of any of Clauses 23-25, wherein the antenna panel information indicating the one or more pairs of antenna panels that are capable of full duplex communication comprises at least one of: a pair of antenna panel identifiers (IDs) identifying the one or more pairs of antenna panels that are capable of the full duplex communication, a pair of antenna group IDs identifying the one or more pairs of antenna panels that are capable of the full duplex communication, or a pair of beam group IDs identifying the one or more pairs of antenna panels that are capable of the full duplex communication.

Clause 27: The method of any of Clauses 23-26, wherein the one or more pairs of antenna panels comprise a subset of a plurality of pairs of antenna panels of the UE that are capable of the full duplex communication.

Clause 28: The method of Clause 27, further comprising transmitting an indication of a number of pairs of antenna panels to include in the subset in the subset from at least one of reconfiguration information stored in the UE, a radio resource control (RRC) message, a media access control-control element (MAC CE), or downlink control information (DCI).

Clause 29: The method of any of Clauses 23-28, wherein the antenna panel information further includes one or more beam pairs, associated with the one or more pairs of antenna panels, for performing the full duplex communication.

Clause 30: The method of Clause 29, wherein each beam pair of the one or more beam pairs includes: a first beam, associated with a first antenna panel of the one or more pairs of antenna panels, for receiving downlink transmissions from the BS, and a second beam, associated with a second antenna panel of the one or more pairs of antenna panels, for transmitting uplink transmissions to the BS.

Clause 31: The method of any of Clauses 29-30, wherein one or more beam pairs comprise pairs of beams having a signal metric above a threshold.

Clause 32: The method of Clause 31, further comprising transmitting an indication of the threshold in at least one of a radio resource control (RRC) message, a media access control-control element (MAC CE), or downlink control information (DCI).

Clause 33: The method of any of Clauses 17-32, wherein communicating with the UE based on the configuration information comprises simultaneously transmitting downlink transmissions associated with a first antenna panel of the at least one pair of antenna panels and receiving uplink transmissions associated a second antenna panel of the at least one pair of antenna panels.

Clause 34: The method of any of Clauses 17-33, wherein transmitting the configuration information comprises transmitting the configuration information in at least one of a radio resource control (RRC) message, a media access control-control element (MAC CE), or downlink control information (DCI).

Clause 35: The method of any of Clauses 17-34, wherein the configuration information includes at least one of one or more panel IDs associated with the at least one pair of antenna panels or one or more antenna ports associated with the at least one pair of antenna panels.

Clause 36: The method of any of Clauses 17-35, wherein the at least one pair of antenna panels comprises a default pair of antenna panels.

Clause 37: An apparatus, comprising: a memory comprising executable instructions; one or more processors configured to execute the executable instructions and cause the apparatus to perform a method in accordance with any one of Clauses 1-36.

Clause 38: An apparatus, comprising means for performing a method in accordance with any one of Clauses 1-36.

Clause 39: A non-transitory computer-readable medium comprising executable instructions that, when executed by one or more processors of an apparatus, cause the apparatus to perform a method in accordance with any one of Clauses 1-36.

Clause 40: A computer program product embodied on a computer-readable storage medium comprising code for performing a method in accordance with any one of Clauses 1-36.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of reporting and configuring antenna panel pairs for full-duplex communication in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication by a user equipment (UE), comprising:
   one or more processors individually or collectively configured to execute instructions stored on one or more memories and to cause the UE to:
      transmit, to a base station (BS), antenna panel information, wherein:
         the antenna panel information separately identifies one or more pairs of antenna panels, from a plurality of antenna panels of the UE, that are capable of full duplex communication with the BS; and
         each identified pair of antenna panels comprises a combination of at least two different antenna panels; and
         the one or more pairs of antenna panels comprise a subset of a plurality of pairs of antenna panels that are capable of the full duplex communication;
      obtain an indication of a number of pairs of antenna panels to include in the subset from at least one of reconfiguration information stored in the UE, a radio resource control (RRC) message, a media access control-control element (MAC CE), or downlink control information (DCI);
      include the indicated number of pairs of antenna panels in the subset;
      receive, from the BS, configuration information indicating at least one pair of antenna panels, from the one or more pairs of antenna panels, for the full duplex communication; and
      use the at least one pair of antenna panels for the full duplex communication with the BS.

2. The apparatus of claim 1, wherein the one or more pairs of antenna panels that are capable of full duplex communication with the BS comprise pairs of antenna panels having a signals metric above a threshold.

3. The apparatus of claim 1, wherein the antenna panel information indicating the one or more pairs of antenna panels that are capable of full duplex communication comprises at least one of:
   one or more pairs of antenna panel identifiers (IDs) identifying the one or more pairs of antenna panels,
   one or more pairs of antenna group IDs identifying the one or more pairs of antenna panels, or
   one or more pairs of beam group IDs identifying the one or more pairs of antenna panels.

4. The apparatus of claim 1, wherein the one or more processors are further configured to cause the UE to determine the one or more pairs of antenna panels based on signal metrics associated with the one or more pairs of antenna panels.

5. The apparatus of claim 4, wherein the signal metrics comprise at least one of:
  signal-to-interference-plus-noise (SINR) ratio metric;
  a downlink reference signal received power (RSRP) metric; or
  an uplink power headroom report (PHR) metric.

6. The apparatus of claim 4, wherein the antenna panel information indicating one or more pairs of antenna panels that are capable of full duplex communication comprises an indication of the signal metrics associated with the one or more pairs of antenna panels.

7. The apparatus of claim 1, wherein, in order to use the at least one pair of antenna panels for the full duplex communication, the one or more processors are configured to cause the UE to simultaneously receive downlink transmissions using a first antenna panel of the at least one pair of antenna panels and transmit uplink transmissions using a second antenna panel of the at least one pair of antenna panels.

8. The apparatus of claim 1, wherein the one or more processors are configured to cause the UE to receive the configuration information in at least one of a radio resource control (RRC) message, a media access control-control element (MAC CE), or downlink control information (DCI).

9. The apparatus of claim 1, wherein the configuration information includes at least one of one or more panel IDs associated with the at least one pair of antenna panels or one or more antenna ports associated with the at least one pair of antenna panels.

10. The apparatus of claim 1, wherein the antenna panel information further includes, for each pair of antenna panels of the one or more pairs of antenna panels:
  a first panel identifier (ID) of a first antenna panel, of the plurality of antenna panels of the UE, for receiving downlink transmissions from the BS; and
  a second panel ID of a second antenna panel, of the plurality of antenna panels of the UE, for transmitting uplink transmissions to the BS.

11. An apparatus for wireless communication by a user equipment (UE), comprising:
  one or more processors individually or collectively configured to execute instructions stored on one or more memories and to cause the UE to:
    transmit, to a base station (BS), antenna panel information, wherein:
      the antenna panel information separately identifies one or more pairs of antenna panels, from a plurality of antenna panels of the UE, that are capable of full duplex communication with the BS;
      each identified pair of antenna panels comprises a combination of at least two different antenna panels;
      the antenna panel information includes one or more beam pairs, associated with the one or more pairs of antenna panels, for performing the full duplex communication; and
      each beam pair of the one or more beam pairs includes:
        a first beam, associated with a first antenna panel of the one or more pairs of antenna panels, for receiving downlink transmissions; and
        a second beam, associated with a second antenna panel of the one or more pairs of antenna panels, for transmitting uplink transmissions;
    receive, from the BS, configuration information indicating at least one pair of antenna panels, from the one or more pairs of antenna panels, for the full duplex communication; and
    use the at least one pair of antenna panels for the full duplex communication with the BS.

12. An apparatus for wireless communication by a user equipment (UE), comprising:
  one or more processors individually or collectively configured to execute instructions stored on one or more memories and to cause the UE to:
    transmit, to a base station (BS), antenna panel information, wherein:
      the antenna panel information separately identifies one or more pairs of antenna panels, from a plurality of antenna panels of the UE, that are capable of full duplex communication with the BS;
      each identified pair of antenna panels comprises a combination of at least two different antenna panels:
      the antenna panel information includes one or more beam pairs, associated with the one or more pairs of antenna panels, for performing the full duplex communication; and
      the one or more beam pairs comprise pairs of beams having a signal metric above a threshold; and
    receive an indication of the threshold in at least one of a radio resource control (RRC) message, a media access control-control element (MAC CE), or downlink control information (DCI);
    receive, from the BS, configuration information indicating at least one pair of antenna panels, from the one or more pairs of antenna panels, for the full duplex communication; and
    use the at least one pair of antenna panels for the full duplex communication with the BS.

13. An apparatus for wireless communication by a base station (BS), comprising:
  one or more processors individually or collectively configured to execute instructions stored on one or more memories and to cause the BS to:
    receive from a user equipment (UE), antenna panel information, wherein:
      the antenna panel information separately identifies one or more pairs of antenna panels, from a plurality of antenna panels of the UE, that are capable of full duplex communication with the BS;
      each identified pair of antenna panels comprises a combination of at least two different antenna panels; and
      the one or more pairs of antenna panels comprise a subset of a plurality of pairs of antenna panels of the UE that are capable of the full duplex communication;
    transmit an indication of a number of pairs of antenna panels to include in the subset in the subset from at least one of reconfiguration information stored in the UE, a radio resource control (RRC) message, a media access control-control element (MAC CE), or downlink control information (DCI);
    transmit, to a user equipment (UE), configuration information indicating at least one pair of antenna panels, from the one or more pairs of antenna panels, to use full duplex communication; and
    communicate with the UE based on the configuration information.

14. The apparatus of claim 13, wherein the one or more processors are further configured to cause the BS to determine the at least one pair of antenna panels based on at least one of the antenna panel information associated with the UE, a beam management report associated with the UE, or one or more uplink reference signals associated with the UE.

15. The apparatus of claim 14, wherein:
the one or more processors are further configured to cause the BS to receive the beam management report from the UE; and
the beam management report includes information that indicates at least one of:
one or more downlink reference signal received power (RSRP) measurements associated with beams corresponding to one or more antenna panels of the UE, or
downlink signal-to-interference-plus-noise (SINR) ratio measurements associated with one or more beam pairs corresponding to one or more pairs of antenna panels of the UE.

16. The apparatus of claim 14, wherein:
the one or more processors are further configured to cause the BS to:
receive the one or more uplink reference signals from a plurality of antenna panels of the UE via a plurality of transmission reception points (TRPs) associated with the base station; and
perform one or more interference measurements associated with the plurality of antenna panels of the UE;
the one or more interference measurements indicate an interference caused between the plurality of TRPs by the received one or more uplink reference signals from the plurality of antenna panels of the UE; and
in order to determine the at least one pair of antenna panels based on the one or more uplink reference signals associated with the UE, the one or more processors are configured to cause the BS to select the at least one pair of antenna panels from the plurality of antenna panels of the UE based on the one or more interference measurements.

17. The apparatus of claim 13, wherein the one or more pairs of antenna panels that are capable of full duplex communication comprise pairs of antenna panels having signals metric above a threshold.

18. The apparatus of claim 17, wherein the antenna panel information indicating the one or more pairs of antenna panels that are capable of full duplex communication comprises an indication of the signal metrics associated with the pairs of antenna panels of the one or more pairs of antenna panels.

19. The apparatus of claim 13, wherein the antenna panel information indicating the one or more pairs of antenna panels that are capable of full duplex communication comprises at least one of:
one or more pairs of antenna panel identifiers (IDs) identifying the one or more pairs of antenna panels,
one or more pairs of antenna group IDs identifying the one or more pairs of antenna panels, or
one or more pairs of beam group IDs identifying the one or more pairs of antenna panels.

20. The apparatus of claim 13, wherein, in order to communicate with the UE based on the configuration information, the one or more processors are further configured to cause the BS to simultaneously transmit downlink transmissions associated with a first antenna panel of the at least one pair of antenna panels and receive uplink transmissions associated a second antenna panel of the at least one pair of antenna panels.

21. The apparatus of claim 13, wherein:
the one or more processors are configured to cause the BS to transmit the configuration information in at least one of a radio resource control (RRC) message, a media access control-control element (MAC CE), or downlink control information (DCI); and
the configuration information includes at least one of one or more panel IDs associated with the at least one pair of antenna panels or one or more antenna ports associated with the at least one pair of antenna panels.

22. An apparatus for wireless communication by a base station (BS), comprising:
one or more processors individually or collectively configured to execute instructions stored on one or more memories and to cause the BS to:
receive, from a user equipment (UE), antenna panel information, wherein:
the antenna panel information separately identifies one or more pairs of antenna panels, from a plurality of antenna panels of the UE, that are capable of full duplex communication with the BS;
each identified pair of antenna panels comprises a combination of at least two different antenna panels;
the antenna panel information includes one or more beam pairs, associated with the one or more pairs of antenna panels, for performing the full duplex communication; and
each beam pair of the one or more beam pairs includes:
a first beam, associated with a first antenna panel of the one or more pairs of antenna panels, for receiving downlink transmissions from the BS; and
a second beam, associated with a second antenna panel of the one or more pairs of antenna panels, for transmitting uplink transmissions to the BS;
transmit, to a user equipment (UE), configuration information indicating at least one pair of antenna panels, from the one or more pairs of antenna panels, to use full duplex communication; and
communicate with the UE based on the configuration information.

23. An apparatus for wireless communication by a base station (BS), comprising:
one or more processors individually or collectively configured to execute instructions stored on one or more memories and to cause the BS to:
receive, from a user equipment (UE), antenna panel information, wherein:
the antenna panel information separately identifies one or more pairs of antenna panels, from a plurality of antenna panels of the UE, that are capable of full duplex communication with the BS;
each identified pair of antenna panels comprises a combination of at least two different antenna panels;
the antenna panel information includes one or more beam pairs, associated with the one or more pairs of antenna panels, for performing the full duplex communication; and one or more beam pairs comprise pairs of beams having a signal metric above a threshold;

transmit an indication of the threshold in at least one of a radio resource control (RRC) message, a media access control-control element (MAC CE), or downlink control information (DCI);

transmit, to a user equipment (UE), configuration information indicating at least one pair of antenna panels, from the one or more pairs of antenna panels, to use full duplex communication; and communicate with the UE based on the configuration information.

24. A method for wireless communication by a user equipment (UE), comprising:

transmitting, to a base station (BS), antenna panel information, wherein:

the antenna panel information separately identifies one or more pairs of antenna panels, from a plurality of antenna panels of the UE, that are capable of full duplex communication with the BS;

each identified pair of antenna panels comprises a combination of at least two different antenna panels;

the antenna panel information includes one or more beam pairs, associated with the one or more pairs of antenna panels, for performing the full duplex communication; and each beam pair of the one or more beam pairs includes:
a first beam, associated with a first antenna panel of the one or more pairs of antenna panels, for receiving downlink transmissions; and
a second beam, associated with a second antenna panel of the one or more pairs of antenna panels, for transmitting uplink transmissions;

receiving, from the BS, configuration information indicating at least one pair of antenna panels, from the one or more pairs of antenna panels, for the full duplex communication; and using the at least one pair of antenna panels for the full duplex communication with the BS.

25. A method for wireless communication by a base station (BS), comprising:

receiving, from a user equipment (UE), antenna panel information, wherein:

the antenna panel information separately identifies one or more pairs of antenna panels, from a plurality of antenna panels of the UE, that are capable of full duplex communication with the BS;

each identified pair of antenna panels comprises a combination of at least two different antenna panels;

the antenna panel information includes one or more beam pairs, associated with the one or more pairs of antenna panels, for performing the full duplex communication; and each beam pair of the one or more beam pairs includes:
a first beam, associated with a first antenna panel of the one or more pairs of antenna panels, for receiving downlink transmissions; and
a second beam, associated with a second antenna panel of the one or more pairs of antenna panels, for transmitting uplink transmissions;

transmitting, to a user equipment (UE), configuration information indicating at least one pair of antenna panels, from the one or more pairs of antenna panels, to use full duplex communication; and communicating with the UE based on the configuration information.

* * * * *